(12) United States Patent
Murthy et al.

(10) Patent No.: US 8,631,153 B2
(45) Date of Patent: Jan. 14, 2014

(54) SYSTEM AND METHOD FOR PROCESSING, ASSIGNING, AND DISTRIBUTING ELECTRONIC REQUESTS

(75) Inventors: Vasudeva Murthy, Rockville, MD (US); Sandeep Srivastava, Sterling, VA (US); Srinivasa R. Guttikonda, Herndon, VA (US); Tushar Pujara, Carrollton, TX (US); Senguttuvan Haridoss, Reddiarpalayam S.O. (IN); Qin Shi, Morganville, NJ (US); Lloyd Williams, Chennai (IN); Yi Huang, Forest Hills, NY (US); Jayanthi Muthukrishnan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 238 days.

(21) Appl. No.: 12/985,442

(22) Filed: Jan. 6, 2011

(65) Prior Publication Data

US 2012/0179836 A1  Jul. 12, 2012

(51) Int. Cl.
*G06F 15/173* (2006.01)
*G06F 3/00* (2006.01)
*G06F 13/00* (2006.01)

(52) U.S. Cl.
USPC ........... 709/238; 709/224; 709/246; 709/249; 709/250

(58) Field of Classification Search
USPC .......... 709/238, 224, 246, 249, 250; 719/315
See application file for complete search history.

(56) References Cited

U.S. PATENT DOCUMENTS

| | | | |
|---|---|---|---|
| 6,570,867 B1 * | 5/2003 | Robinson et al. | 370/351 |
| 8,204,809 B1 * | 6/2012 | Wise | 705/35 |
| 2002/0004844 A1 * | 1/2002 | Harari et al. | 709/238 |
| 2005/0228774 A1 * | 10/2005 | Ronnewinkel | 707/2 |
| 2007/0033546 A1 * | 2/2007 | Merry et al. | 715/837 |
| 2008/0205624 A1 * | 8/2008 | Mandalia et al. | 379/265.02 |
| 2009/0193433 A1 * | 7/2009 | Maes | 719/315 |

* cited by examiner

*Primary Examiner* — Beemnet Dada
*Assistant Examiner* — Kalish Bell (57) ABSTRACT

A system and method for processing and managing electronic requests may include an input module configured to receive a plurality of electronic requests associated with at least one of a product, service, order, and status. The system may comprise a classification module configured to assign each electronic request to at least one category; a transformation module configured to convert the electronic requests into a format compatible with one or more downstream systems; a distribution module configured to distribute the electronic requests based on routing rules to one or more downstream systems, which responds to the at least one request; a management module configured to manage the electronic requests; or a monitoring module configured to present, via a graphical user interface, information associated with at least one of the electronic requests to a user.

20 Claims, 12 Drawing Sheets

Work Management Screen ( Work Task ) ( Hierarchy ) ( Ctr Report ) ( User's Work Task ) ( Classification ) ( Performance ) ( Pending CDDD )
( Milestone Work Task ) ( Milestone Hierarchy ) ( Aged Work Task ) ( Aged Hierarchy ) ( Director Rpt )

500A

LOGOUT ☐

MILESTONE HIERARCHY REPORT
View Service Requests

Export View to MS Excel

Expand All

| Organizational Hierarchy | TOTAL ACTIVE | TOTAL TASK SCORE | ASGN | ACK | REOP | CONF TDA | CLSD TDA | ACKS DUE TDA | CONFS DUE TDA | MISSED ACK | MISSED CONF | TOTAL MISSED | MISSED ACK % | MISSED CONF % |
|---|---|---|---|---|---|---|---|---|---|---|---|---|---|---|
| ⊞ KATHLEEN MCLEAN | 7518 | 12916 | 945 | 6124 | 449 | 2465 | 1358 | 49 | 312 | 268 | 2282 | 2550 | 4% | 30% |
| ⊞ BRENDA FINCH | 7517 | 12915 | 944 | 6124 | 449 | 2465 | 1358 | 49 | 312 | 267 | 2281 | 2548 | 4% | 30% |
| ⊞ DANIEL LORENTE | 16 | 19 | 12 | 4 | 0 | 24 | 1 | 9 | 0 | 0 | 2 | 2 | 0% | 12% |
| ⊞ DONELLA | 1 | 1 | 0 | 1 | 0 | 0 | 0 | 0 | 0 | 0 | 0 | 0 | 0% | 0% |
| WALKER KIMBERLY | 1 | 1 | 0 | 0 | 0 | 9 | 0 | 0 | 0 | 0 | 0 | 0 | 0% | 0% |
| SPADARO CYNTHIA | 0 | 0 | 0 | 0 | 0 | 3 | 0 | 0 | 0 | 0 | 0 | 0 | 0% | 0% |
| MORVAN DONNA | 0 | 0 | 0 | 0 | 0 | 2 | 0 | 0 | 0 | 0 | 0 | 0 | 0% | 0% |
| KENYERES LOURDES | 0 | 0 | 0 | 0 | 0 | 1 | 0 | 0 | 0 | 0 | 0 | 0 | 0% | 0% |
| GUILLEN TAMARA | 1 | 1 | 0 | 1 | 0 | 3 | 0 | 0 | 0 | 0 | 0 | 0 | 0% | 0% |
| MCINTYRE ROBERT | 0 | 0 | 0 | 2 | 0 | 0 | 0 | 0 | 0 | 0 | 0 | 0 | 0% | 0% |
| KANNEGIESER | 14 | 17 | 12 | 2 | 0 | 15 | 1 | 9 | 0 | 0 | 2 | 2 | 0% | 14% |
| ⊞ EDWARD CORROTHERS | 1111 | 1504 | 377 | 691 | 43 | 363 | 100 | 21 | 68 | 258 | 504 | 762 | 23% | 45% |

Customer Request Counts and Milestone

Fig. 5A

Assigned Work 500B

Re-Assign | Refresh | Export to Excel

Search For...

▽ Expand All  ▷ Collapse All
Overall Task Score: 415
Showing Items 1 to 32 of 423 Next>

| O | SRs | | Task Score | Customer | From | Subject | Source | ID | Activity | Product | State | NSPE ID | CR Status | Fulfill. Status | Owner | Que |
|---|---|---|---|---|---|---|---|---|---|---|---|---|---|---|---|---|
| O | 2 | ▷ | 2 | FIRST COMMONWEAL... | ...ky@fcbanking.com | Greensburg/Latro... | ✉ | | ORD | OTHER | Mt | ...01950858 | ACK | | Deana R. Rape | PA |
| | | | 1 | FIRST COMMONWEAL... | ...ky@fcbanking.com | Greensburg/Latro... | ✉ | | ORD | OTHER | Mt | ...01950858 | ASGN | | Deana R. Rape | PA |
| | | | 1 | FIRST COMMONWEAL... | | Listings 724 463... | 🕮 | SD20080930649534 | ORD | | PA | ...01950858 | COMP | BCN | Deana R. Rape | PA |
| | 1 | ▷ | 1 | north irwin | | none | 🕮 | | | | PA | ...01987829 | ACK | | Deana R. Rape | DEF |
| | | | 1 | north irwin | | none | 🕮 | SB20080804103567 | ORD | | PA | ...01987829 | COMP | BCN | Deana R. Rape | DEF |
| O | 1 | ▷ | 1 | INTERNAL VZB | ...izonbusiness.com | Borough of South... | ✉ | | ORD | POTS | PA | ...01989450 | ACK | | Mary Ann A Miele | PA |
| | | | 1 | INTERNAL VZB | ...izonbusiness.com | Borough of South... | ✉ | SF20080808253404 | ORD | POTS | PA | ...01989450 | COMP | BCN | Mary Ann A Miele | PA |
| | 1 | ▷ | 0 | Unknown | ...core.verizon.com | RE: Issue on Ver... | ✉ | | NO ACT | Centrex | PA | ...01995575 | REOP | | Deana R. Rape | PA |
| | | | 0 | Unknown | ...core.verizon.com | RE: Issue on Ver... | ✉ | | NO ACT | Centrex | PA | ...01995575 | COMP | ACT COMP | Deana R. Rape | PA |
| O | 1 | ▷ | 1 | FIRST COMMONWEAL... | ...ky@fcbanking.com | BTN 814 288-3829... | ✉ | | BILL INQ | OTHER | PA | ...01999146 | ACK | | Deana R. Rape | PA |
| | | | 1 | FIRST COMMONWEAL... | ...ky@fcbanking.com | BTN 814 288-3829... | ✉ | | BILL INQ | OTHER | PA | ...01999146 | COMP | ACT COMP | Deana R. Rape | PA |
| O | 1 | ▷ | 4 | PJM INTERCONNE... | ...izonbusiness.com | FW: Disconnects... | ✉ | | ORD | Frame Relay | PA | ...02001978 | ACK | | AMY SRAKA | PA |
| | | | 4 | PJM INTERCONNE... | ...izonbusiness.com | FW: Disconnects... | ✉ | | ORD | Frame Relay | PA | ...02001978 | COMP | ACT COMP | Tami B Bamberge | PA |

Screen for Service Request Status Notifications
File Edit View Favorites Tools Help

| Worklists | Administration | Search | Tools | Quick Links | | Signed In: USER | LOG OUT |

Service Request Status (DOE) : ID (SF20080430625576)

◁ Previous Page

▼ Request Status Summary
Request ID (LSRN): SF20080430625576
Status: PCN    Date Submitted: 02/25/2008    Version: 1    SO Quantity : 1    [Change]

▼ Service Order Details

| Service Order ID | Image | SO Status | BTN | Due Date | PCN Date | State: WI | BCN Date |
|---|---|---|---|---|---|---|---|
| C3494816 | | COMPLETED | 7154432226 | 05/05/2008 | Mon May 05 12:49:50 EDT 2008 | | |

▼ Request Status Details

| User | Date/Time | Detail |
|---|---|---|
| System | Mon May 05 12:49:55 EDT 2008 | PCN |

| | |
|---|---|
| Rep: | BA TISOC |
| Rep Tel No: | 8006849012 |
| Customer's Remarks: | |
| Completion Date: | 2008-05-05T00:00:00.000-04:00 |

System Wed Apr 30 16:08:24 EDT 2008

Local Response

| Customer: | MARATHON HIGH SCHOOL |
|---|---|
| Customer Service Address: | 204 EAST ST, MARATHON,WI,544489642 |
| Verizon Order ID: | C3494816 |
| Assigned Due Date: | 2008-05-05 |
| Requested Due Date: | |
| Billing Account Number: | 7154432226 |
| Telephone Numbers Assigned: | 7154432823, 7154432227, 7154432911, 7154432009, 7154432611, 7154433744, 7154432226, 7154433801 |
| Customer Work Order #: | |

Assigned Work Screen 700B

Re-Assign | Refresh | Export to Excel

Search For...

▽ Expand All  △ Collapse All
Showing Items 1 to 50 of 528 Next>

| O | SRs | | Customer | From | Subject | Source | ID | Activity | Product | State | NSPE ID | CR Status | Fulfill. Status | Owner | Queue | Received △ | Due |
|---|---|---|---|---|---|---|---|---|---|---|---|---|---|---|---|---|---|
| O | ☐ 1 ▽ | | AMSCOT FINANCIAL... | .izonbusiness.com | FW: AMSCOT IP VP... | ✉ | | ORD | Frame Relay | FL | ..01552512 | ACK | | LISA VITEK | MW SPECIALS | 02/06/2008 13:18 | |
| O | ☐ 1 ▽ | ☐ | CHARTER COMMUNIC... | ..eath@charter.net | State AU CentralN... | ✉ | | ORD | POTS | WI | ..01591314 | ACK | | MISSY DAVIDSON | MW POOL | 02/25/2008 11:13 | |
| | | ☐ | CHARTER COMMUNIC... | ..eath@charter.net | State AU CentralN... | ✉ | SF20080430625576 | ORD | POTS | WI | ..01591314 | COMP | PCN | MISSY DAVIDSON | MW POOL | 02/25/2008 11:13 | 20080505 |
| | ☐ 1 ▽ | ☐ | MID FLORIDA FEDE... | a@midflorida.com | New phone lines | ✉ | | | | OH | ..01618476 | ACK | | CONNIE SINE | MW POOL | 03/06/2008 14:29 | |
| | | ☐ | MID FLORIDA FEDE... | a@midflorida.com | New phone lines | ✉ | SB20080310271101 | ORD | POTS | OH | ..01618476 | COMP | PCN | CONNIE SINE | MW POOL | 03/06/2008 14:29 | 20080313 |
| O | ☐ 1 ▽ | ☐ | State of Illinoi... | | State of Illinois... | ☎ | | BILL INQ | | -- | | ACK | | KIMBERLY BLACKWELL | DEFAULT | 03/11/2008 16:59 | |
| | | ☐ | State of Illinoi... | | State of Illinois... | ☎ | | BILL INQ | | -- | | ASGN | PEND | KIMBERLY BLACKWELL | DEFAULT | 03/11/2008 16:59 | |
| O | ☐ 1 ▽ | ☐ | State of Illinoi... | | State of Illinois... | ☎ | | ACCT INQ | | -- | | | | KELLIE C SHIELDS | DEFAULT | 03/11/2008 17:01 | |
| O | ☐ 1 ▽ | ☐ | GIANT EAGLE INC | .r@gianteagle.com | Fuel 3689 | ✉ | | ORD | POTS | OH | ..01645088 | ACK | | KIMBERLY BLACKWELL | MW POOL | 03/19/2008 09:16 | |
| | | ☐ | GIANT EAGLE INC | .r@gianteagle.com | Fuel 3689 | ✉ | SA20080319524693 | ORD | POTS | OH | ..01645088 | COMP | CONF | MARK THOMAS | MW POOL | 03/19/2008 09:16 | 20080414 |
| | ☐ 1 ▽ | ☐ | INTERNAL VZB | .izonbusiness.com | City of North Po... | ✉ | | BILL INQ | Unknown | FL | ..01647047 | ACK | | MISSY DAVIDSON | MW POOL | 03/19/2008 15:34 | |
| | | ☐ | INTERNAL VZB | .izonbusiness.com | City of North Po... | ✉ | | BILL INQ | Unknown | FL | ..01647047 | COMP | ACT COMP | MISSY DAVIDSON | MW POOL | 03/19/2008 15:34 | |

Fig. 7B

Screen for Service Order Details — 700C

File Edit View Favorites Tools Help

Signed In: USER   LOG OUT

| Worklists | Administration | Search | Tools | Quick Links |

Service Order Number: C3494816

◁ Previous Page

▼ Order Details

| | | | |
|---|---|---|---|
| Customer Name: | MARATHON HIGH SCHOOL | Status: COMPLETED | BTN: 7154432226 | Class of Service: BCTX |
| Order Activity: | Change | LOB: 0202 | CPON: X000000000310865 | Customer Number: 2775035574 |
| Date Updated: | 05/05/2008 | Creation Date: 04/29/2008 | Due Date: 05/05/2008 | PON: X000000000310865 |
| LSRN: | SF20080430625576 | Sales Code: JJJ | Office Code: | |
| Processing Center: | ILLINOIS/WISCONSIN | | | |

▼ Order History

| Date | Status | BTN |
|---|---|---|
| 05/05/2008 | COMPLETED | 7154432226 |
| 05/02/2008 | RELEASED | 7154432226 |
| 05/02/2008 | RELEASED | 7154432226 |
| 05/01/2008 | RELEASED | 7154432226 |
| 04/30/2008 | RELEASED | 7154432226 |

◁ Previous Page

Service Order Screen

Print

SUMMARY
ORDER         3494816
STATUS        COMP
TN            7154432226
CKT
REGION        W
DD            2008-05-05
COEFFORD      0
SUFFIX        CNTX
REMARKS       COMPLETED
ORDERCREATIONDATE      2008-04-29
ORDERCOMPLETIONDATE    2008-05-05
NOCVREGION    L
FDT
CLEC
STATE         WI

DETAILS
02            MARATHON HIGH SCHOOL
0202          204; EAST ST;

Service Order Screen

0203     MARATHON; WI; 544489642;
11A001   7154432009 001 SG 01, CPU NA, HG NA, ITC 217
11A002   7154432226 001 SG 01, CPU NA, HG B-1, ITC 210
11A003   7154432227 001 SG 01, CPU NA, HG B-2, ITC 212
11A005   7154432611 001 SG 01, CPU NA, HG NA, ITC 221
11A006   7154432736 001 SG 01, CPU NA, HG NA, ITC 218
11A007   7154432823 001 SG 01, CPU NA, HG B-4, ITC 200
11A008   7154432911 001 SG 01, CPU NA, HG B-5, ITC 214
11A009   7154433609 001 SG 01, CPU NA, HG NA, ITC 219
11A010   7154433774 001 SG 01, CPU NA,HG B-6, ITC 215
11A011   7154433801 001 SG 01, CPU NA, HG B-7, ITC 216
110001   CYW7WC-12829-KF-E RE 0.3B RJ11C(3)
110002   GREAT CENTRAL COMMUNICATIONS 443-3177
110005   1-4-88 NO 3RD PTY NUMBER CALLS ACCEPTED PER DOTY BVT
110006   CALL TRACE ON LNS 443-2226,2227,2823, 2911,3774 & 3801

Fig. 8

SYSTEM AND METHOD FOR PROCESSING, ASSIGNING, AND DISTRIBUTING ELECTRONIC REQUESTS

BACKGROUND INFORMATION

Television, data, and voice services are popular among consumers. A single service provider is capable of providing all of these services to its subscribers. It is not uncommon for a service provider to receive hundreds, even thousands, of electronic requests a month. These electronic requests may include orders for services or products, billing or account inquiries, bill payments or adjustments, and tech support requests. Each of these electronic requests represents a work item from a subscriber, potential customer, or a customer care department within organization. Employees, representatives, and technicians of the service provider respond to these electronic requests to address or resolve issues identified in the electronic requests. While some automated processes have been developed to assist in managing such large volumes of work, current systems lack a technique to comprehensively and effectively process, categorize, distribute, and manage electronic requests to optimize work management, end-to-end monitoring, flow through enablement, and overall product delivery.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIGS. 5A-5B depict illustrative screens for processing and managing electronic requests, according to an exemplary embodiment.

FIG. 7B depicts an illustrative screen for assigned work, according to an exemplary embodiment.

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for processing and managing electronic requests. That is, exemplary embodiments may, among other things, expand and optimize systems management within distributed computing environments by comprehensively and effectively providing an automated work management system and method based on multi-dimensional attributes in order to process, assign, categorize, distribute, monitor, and manage electronic requests.

As discussed above, a service provider may receive hundreds, even thousands, of electronic requests that require attention and resolution. These electronic requests may include orders, payments, inquiries, and troubleshooting requests, each coming from various sources. The service provider may typically receive and manually manage these electronic requests in order to address or resolve issues associated with each electronic request. However, a manual response to resolve, analyze, and categorize these electronic requests may be highly time consuming, not to mention wasteful and inefficient since large quantities of resources may be expended in the process.

Lack of uniformity and standardization may also contribute to imprecise analysis. For example, when manually sifting through many unrelated requests coming from a variety of sources and covering a wide range of issues in varying fields, accurate results may not be readily attainable. For example, two or more subscribers may inquire about a billing issue. One of the subscribers may report an issue via telephone and speak with a service provider representative. The representative may generate a work item, pass the work item along to a specialist to help the subscriber resolve the issue, and record the entire transaction in the work item (e.g., how the subscriber described the issue, how the representative interpreted the issue, how it was resolved, etc.). A second subscriber may encounter the similar billing issue and may also report the issue via telephone. However, despite encountering a similar issue, the second subscriber may describe the issue differently than the first subscriber. Furthermore, she may speak with different service provider representative, who also interprets the issue in a different way. Although the issue eventually gets resolved, the work item that is generated may include different words and elements than that of the work item corresponding to the first subscriber.

A third subscriber may also encounter a similar billing issue, but rather than calling in, she may transmit an electronic communication via electronic submission (e.g., through the service provider's website, by email, or by fax). In this case, a work item description may be generated based on her electronic submission by a computer or other similar automated system. Although submitted based on a very similar billing issue, the work item generated in this case may be different than that of the other aforementioned work items, containing different elements, description of the issue, method of resolving the issue, etc. Therefore, when all these work items are analyzed, they may be processed, categorized, distributed, and managed differently, even though they may be handled in a similar fashion since they pertain to a similar issue.

Accordingly, when analyzing large quantities of related and unrelated work items covering a wide range of issues in varying fields coming from a variety of sources and methods, analyzing and managing these work items in a reliable way may prove difficult.

While some automated processes have been developed to assist in managing such large volumes of electronic requests, these processes continue to fail in many ways. But processing, categorizing, distributing, and managing electronic requests and work items according to various embodiments, a comprehensive and effective way to optimize work management, end-to-end monitoring of work items, flow through enablement, and overall product delivery may be provided. According to various embodiments, processing and managing electronic requests may provide a streamlined and consistent approach that may eliminate, mitigate, or preempt inefficiencies associated with traditional techniques.

It should be appreciated that the term, "electronic request," as used herein, may refer to any input data that is received. Such data may include a data associated with orders, services, products, inquiries, accounts, billing, payments, or other similar request. In some embodiments, an electronic request may be an email, fax, or other communication from a subscriber, customer, potential customer, or company division or group, such as an agent, representative, call center, business center, or storage unit. It should be appreciated that the term, "work item," as used herein, may be used interchangeably with "electronic request." Although embodiments of the present disclosure are primarily discussed with respect to processing and managing electronic requests or work items, it should be appreciated that other types of data may also be processed and managed.

Figure 1:
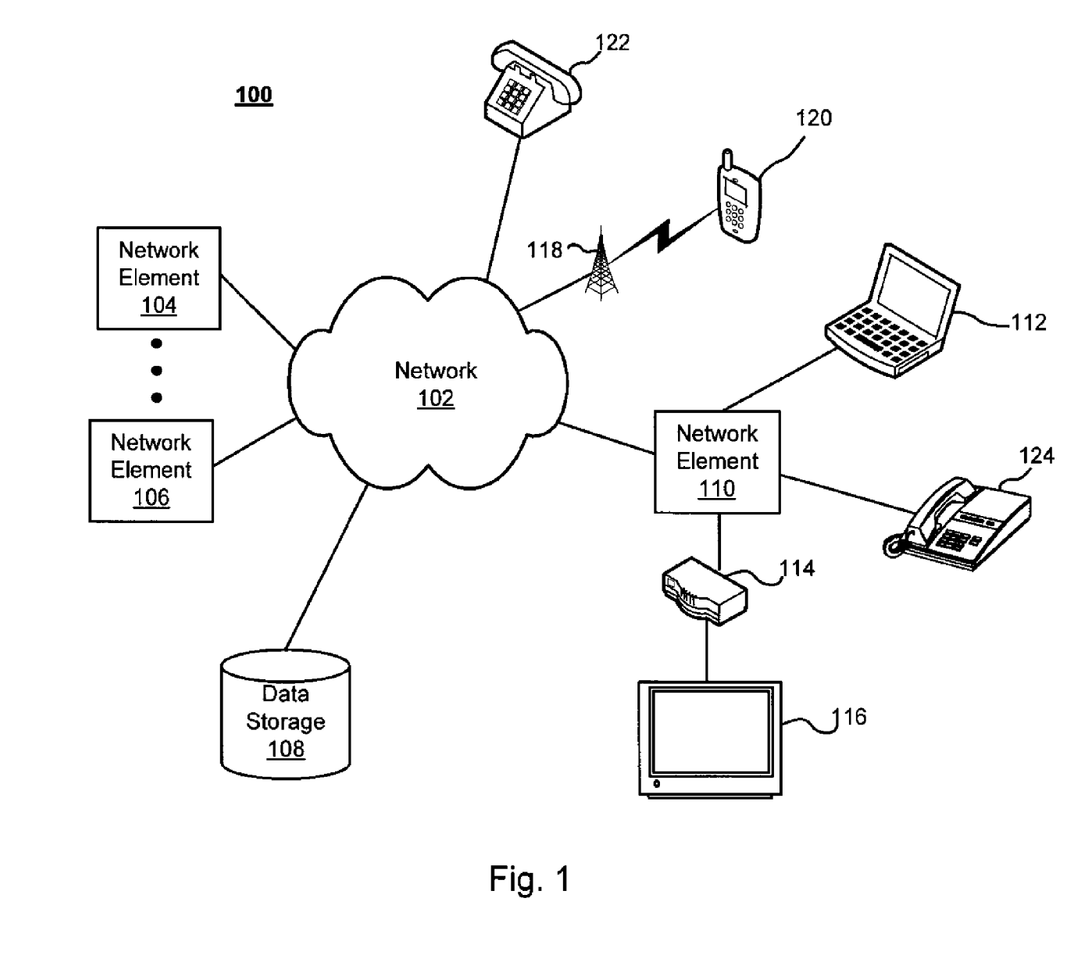
FIG. 1 depicts a block diagram of a system architecture for processing and managing electronic requests, according to an exemplary embodiment.

FIG. 1 depicts a block diagram of a system architecture for processing and managing electronic requests, according to an exemplary embodiment. As illustrated, network 102 may be communicatively coupled with one or more devices including network element 104, network element 106, data storage 108, and network element 110. Other devices may be communicatively coupled with network 102 via one or more intermediary devices, such as transceiver 118, network element 110, or a wireline phone 122. Wireless device 120 may be communicatively coupled with network 102 via transceiver 118. Network client 112 and set-top box 114 may be communicatively coupled with network 102 via network element 110. Wireless control 110 may be communicatively coupled with set-top box 114 via infrared, Bluetooth communication, or other wireless technologies. A video display (e.g., television set 116) may be communicatively coupled to set-top box 114. It should also be appreciated that other various components may also be communicatively coupled with the network element 110, such as a Voice over Internet Protocol ("VoIP") phone 124.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support, an Internet network, a wireless communication network, a cellular network, or the like, or any combination thereof.

Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cable television network, corporate networks, or home networks.

Network elements 104, 106, 110, and data storage 108 may transmit and receive data to and from network 102 representing broadcast content, user request content, mobile communications data, or other data. The data may be transmitted and received utilizing a standard telecommunications protocol or a standard networking protocol. For example, one embodiment may utilize Session Initiation Protocol ("SIP"). In other embodiments, the data may be transmitted or received utilizing other Voice Over IP ("VoIP") or messaging protocols. For example, data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 102 may use standard wireless protocols including IEEE 802.11a, 802.11b and 802.11g. Network 102 may also use protocols for a wired connection, such as an IEEE Ethernet 802.3.

Transceiver 118 may be a repeater, a microwave antenna, a cellular tower, or another network access device capable of providing connectivity between to different network mediums. Transceiver 118 may be capable of sending or receiving signals via a mobile network, a paging network, a cellular network, a satellite network or a radio network. Transceiver 118 may provide connectivity to one or more wired networks and may be capable of receiving signals on one medium such as a wired network and transmitting the received signals on a second medium, such as a wireless network.

Wireless device 120 may be a mobile communications device, wireline phone, a cellular phone, a mobile phone, a satellite phone, a personal digital assistant ("PDA"), a computer, a handheld MP3 player, a handheld multimedia device, a personal media player, a gaming device, or other devices capable of communicating with network 102 via transceiver 118.

Network elements, transceiver 118, data storage 108, and set-top box 114 may include one or more processors for recording, transmitting, receiving, or storing data. Although network elements, transceiver 118 and data storage 108 are depicted as individual elements, it should be appreciated that the contents of one or more of a network element, transceiver 118, and data storage 108 may be combined into fewer or greater numbers of devices and may be connected to additional devices not depicted in FIG. 1. Furthermore, the one or more devices may be local, remote, or a combination thereof a first network elements, transceiver 118, and data storage 108.

Data storage 108 may be network accessible storage and may be local, remote, or a combination thereof to network elements 104, 106, and 110. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

Network elements 104, 106, and 110 may be one or more servers (or server-like devices), such as a Session Initiation Protocol ("SIP") server. Network elements 104, 106, and 110 may include one or more processors (not shown) for recording, transmitting, receiving, or storing data. According to one or more embodiments, network elements 104, 106, and 110 may be servers providing media content to one or more users. In other embodiments, network elements 104, 106, and 110 may be servers that provide network connection between two or more wireless devices 118. Network elements 104, 106, and 110 may also be servers of a service provider, the Internet, a broadcaster, a cable television network, or another media provider.

Network element 110 may be a residential gateway, such as a router, an optical network terminal or another piece of Customer Premises Equipment ("CPE") providing access to one or more pieces of equipment. For example, network element 110 may provide audio/video programming content feeds to a set-top box, such as set-top box 116. Network element 110 may also provide network connectivity for other clients, such as a Voice Over IP ("VoIP") phone (not shown) and a network client, e.g., network client 112.

Network client 112 may be a desktop computer, a laptop computer, a server, a personal digital assistant, or other computer capable of sending or receiving network signals (e.g., CPE, a television, radio, phone, appliance, etc.). Network client 112 may use a wired or wireless connection. It should also be appreciated that the network client 112 may be a portable electronic device capable of being transported. For example, these may include a digital picture frame, an electronic reader device, or other portable device. Such a device may transmit or receive signals and store information in transit, and in the event it is transported out of the unit, the portable electronic device may still operate using the data (e.g., digital image, electronic book, etc.) it stored. Although depicted as connected via a residential gateway in FIG. 1, it should be appreciated that the network client 112 may connect directly to network 102 or via other network connectivity devices as well. According to one or more embodiments, network client 112 using a wireless connection may authenticate with a network using Wired Equivalent Privacy ("WEP"), Wi-Fi Protected Access ("WPA"), or other wireless network security standards.

System 100 may be used for mobile telecommunications between two or more components of the system 100, e.g., two or more wireless devices, wireless device with network client, set top box with wireless device, landline phone, VoIP, etc. System 100 may also be used for transmitting or receiving a variety of content. The various components of system 100 as shown in FIG. 1 may be further duplicated, combined or integrated to support various applications and platforms. Additional elements may also be implemented in the systems described above to support various applications.

Figure 2:
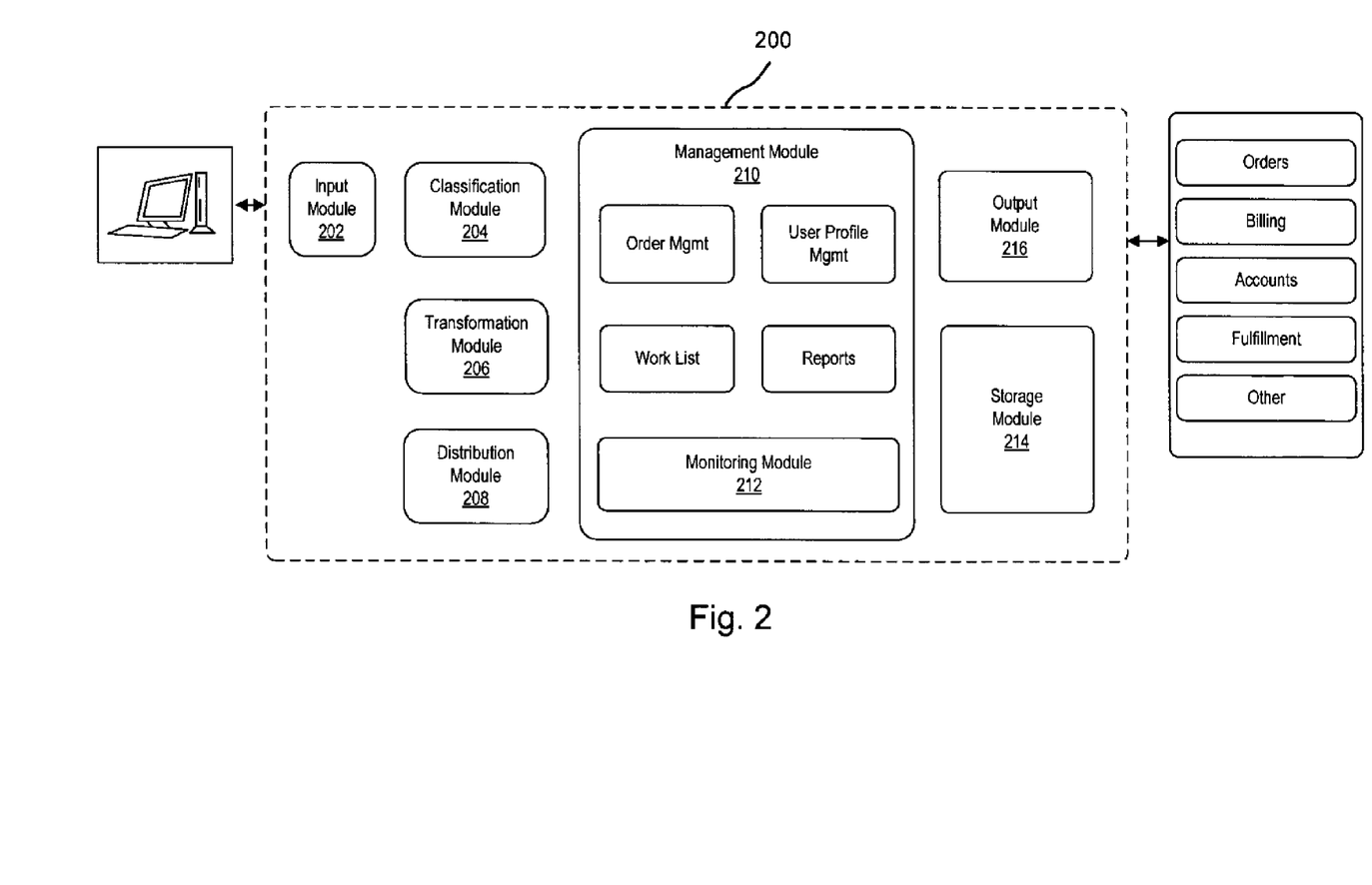
FIG. 2 depicts a block diagram of a hardware module component for processing and managing electronic requests, according to an exemplary embodiment.

FIG. 2 depicts a block diagram of hardware module components for processing and managing electronic requests 200, according to an exemplary embodiment. As illustrated, a processing and management module 200 may be provided to handle a variety of electronic requests. The processing and management module 200 may comprise one or more components, such as an input module 202, a classification module 204, a transformation module 206, a distribution module 208, and a management module 210, all of which may be communicatively coupled to one another. Although the processing and management module 200 is depicted as a single module, processing and management module 200 may be incorporated as a single component or may be distributed across a plurality of physical components, such as one or more centralized servers, pieces of customer premises equipment, or end user devices. In some embodiments, the processing and management module 200 may be utilized in a virtual environment or as software.

The description below describes network elements, computers, and components of a system of and method for processing and managing electronic requests that may include one or more modules. As used herein, the term "module" may be understood to refer to non-transitory executable software, firmware, hardware, and various combinations thereof. Modules however are not to be interpreted as software which is not implemented on hardware, firmware, or recorded on a processor readable recordable storage medium (i.e., modules are not software per se). It is noted that the modules are exemplary. The modules may be combined, integrated, separated, and duplicated to support various applications. Also, a function described herein as being performed at a particular module may be performed at one or more other modules and by one or more other devices instead of or in addition to the function performed at the particular module. Further, the modules may be implemented across multiple devices and other components local or remote to one another. Additionally, the modules may be moved from one device and added to another device, and may be included in both devices.

Input module 202 may receive inputs from a variety of input sources. For example, these inputs may be electronic requests received from end users, customers, or subscribers from subscriber-side components 112-122 of system 100. These one or more inputs may also be received from other groups or divisions of an organization (e.g., service provider), such customer care representatives, agents, call centers, or business centers, represented by at least vendor-side components 104-108 of system 100. The electronic requests may be work items to be handled by the service provider. As described above, these electronic requests may include work items associated with orders, services, products, account, billing, payments, status, etc.

Classification module 204 may process the electronic requests or work items by classifying or categorizing the electronic requests based on the content in the electronic requests. Classification module 204 may comprise one or more processors that analyze content in each of the electronic requests. The classification module 204 may also extract other data, such as business data, customer data, etc.

It should be appreciated that classification of electronic essentially "reads" each electronic request and places the email requests in one or more categories based on the information in each electronic request. Classification and assignment may also involve identifying key information from the electronic requests. For example, the classification module 204 may identify attributes in the electronic requests, such as names, addresses, email addresses, telephone numbers or other contact information, keywords and phrases, date, time, etc. The requests may be assigned or categorized in a variety of categories, such as "order," "billing inquiry," "account inquiry," etc. The one or more processors of the classification module 204 may comprise capabilities to parse the data in each electronic request, pattern match, identify words phrases, etc. Priority and weighted classifications may also be assigned. In other words, there may be certain attributes that are weighed more heavily than others, thus providing a greater priority or weight when determining and balancing what category to assign an electronic request. The one or more processors may also be communicatively coupled to one or more dictionaries or databases to refine its classification features and functions. It should also be appreciated that each electronic request may be assigned to more than one category, as various portions of the electronic request may be directed to different categories.

In addition to providing an automated classification feature, as described above, the classification module 204 may also utilize natural language processing to analyze the electronic requests Natural language processing may enable emails written in plain language to be further parsed and analyzed. Tokenization may also be used as part of the natural language processing.

It should be appreciated that natural language processing may be grounded in machine-learning, which may use algorithms grounded in statistical inference to "learn" (e.g., by analysis of large samples of typical real-world examples). Using natural language processing with machine-learning capabilities may result in reduced error, greater accuracy, and overall classification optimization. In additional natural language processing may find one or more advantages in performing a variety of other features and functions, such as summarization, co-reference resolution, discourse analysis, segmentation, named entity recognition (NER), natural language generation, natural language understanding, speech recognition, question answering, word sense disambiguation, information retrieval, information extraction, language-based relationship processing. In other words, the classification module 204 may not only provide optimized classification of the work items by analyzing and keying in on attributes to help ensure that the work items are classified properly (and therefore reach the proper parties, groups, or division to handle the work), but also a variety of other business-related benefits.

Transformation module 206 may also process the electronic requests by converting the data in the electronic requests into a consistent and compatible format usable by other downstream components. In some embodiments, for example, the transformation module 206 may convert the electronic requests into extensible markup language (XML) documents that may be compatible with an ordering and fulfillment system, billing system, or other downstream system or component. Other various formats or structures may also be provided.

Figure 3:
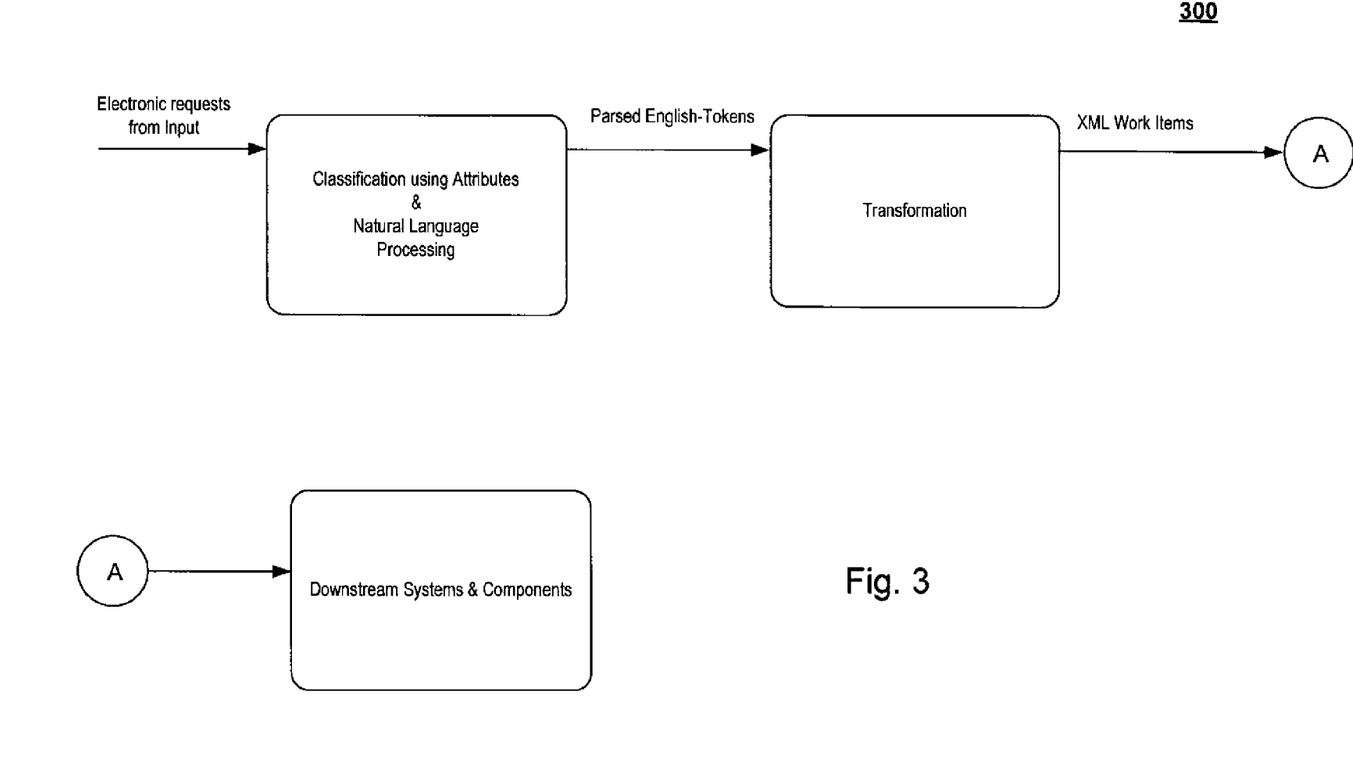
FIG. 3 depicts an illustrative flow for processing electronic requests using a natural language processing module component and transformation module component, according to an exemplary embodiment.

FIG. 3 depicts an illustrative flow for processing electronic requests using a natural language processing module component and transformation module component 300, according to an exemplary embodiment. As shown in flow 300, electronic requests may be received at the classification module 204 for analyzing attributes and natural language processing. The electronic requests may then be parses or tokenized for conversion in to one or more other formats at the transformation module 206. As described, above the electronic request may be transformed and converted to a work item format that is usable and compatible for a variety of downstream systems and components.

Distribution module 208 may sort all electronic requests into queues based on a variety of routing rules. Routing rules may be based on customer, state, product, activity, email address, classification, other various attributes, or a combination thereof. In some embodiments, the routing rules may use keywords to determine attribute values on each new task, similar to the priority and weighting features described above for classification.

It should be appreciated that the attributes used for routing and distributing the electronic requests may be used for skill-based routing or distribution. For example, the distribution module 208 may utilize an auto-assignment feature, where users may be automatically assigned work items based on their skill level and ability to handle tasks. In some embodiments, a coefficient may be assigned to the work items. Users may then be able to "pull" new work items or tasks or have them automatically assigned to them based on their profile which may show that they are able to handle at least that coefficient level. It should be appreciated that distribution may also be based on customer attributes and profile. It should be appreciated that such auto-assignment may be turned on or off. Other various customizable features may also be provided.

Figure 4:
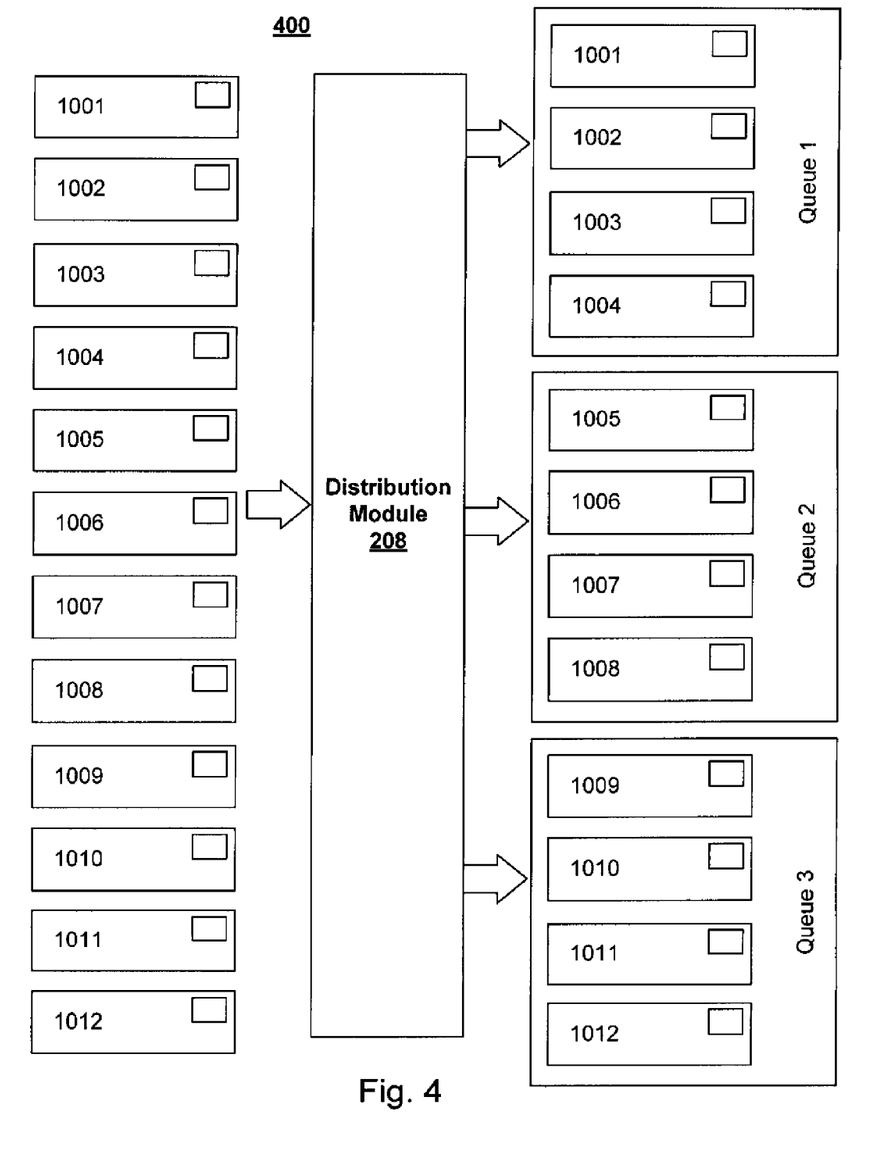
FIG. 4 depicts an illustrative flow for routing and distributing electronic requests, according to an exemplary embodiment.

FIG. 4 depicts an illustrative flow 400 for routing and distributing electronic requests, according to an exemplary embodiment. As depicted, electronic requests identified as 1001-1012 may be disorderly and unassigned. The distribution module 208 may route and distribute these work items into one or more queues for efficient processing and management. In this example, the work items may be placed in three different queues (e.g., Queue 1-3). It should be appreciated that a greater or lesser of queues may be available, as well as other distribution features related to those described above, may also be provided.

The management module 210 may manage the electronic requests and work items. Referring back to FIG. 2, the management module 210 may provide order management, user profile management, work list, and reports. A variety of other features and functions may also be provided by the management module 210. For example, the management module 210 may also comprise a monitoring module 212. The monitoring module 212 may provide a graphical user interface (GUI) for a user to interact with a real-time or near real time dashboard, measure and track work items, monitor hierarchal service level agreements (SLAs), or provide quick responses to issues. In other words, the monitoring module 212 may provide optimum visualization and interactive properties to an already robust processing and management module 200. It should be appreciated that the monitoring module 212 may also provide end-to-end status views of various work items, which may be general or detailed views.

The management module 210 may provide multiple channel interaction, automated or manual communication, and template management. In this way, complex requests and easy requests may be handled and processed in an expedient manner and improve efficiency. It should also be appreciated that secure partitions and other security features may also be provided.

Storage module 214 may manage or access the one or more inputs using electronic storage, including databases or other organized electronic storage. Storage module 214 may provide one or more interfaces and stored any data associated with the modules in the processing and management module 200. Storage module 214 may be communicatively coupled to one or more physical media, such as, but not limited to, a data storage unit, a server, a compact disc (CD), a digital versatile disc (DVD), a floppy disk, a hard drive, read only memory (ROM), random access memory (RAM), as well as other physical media capable of storing software, data other storage information, or combinations thereof.

Output module 216 may transmit the processed electronic requests to one or more downstream components and systems. For example, the output module 216 may work with the distribution module 208 to output the classified and transformed work requests to the appropriate downstream system or component for further processing. These may include orders, billing, accounts, fulfillment, or a variety of other downstream systems or components. The output module 216 may also be used to generate and present reports with the management module 210. These reports may be provided in a variety of formats, including spreadsheets, text, or for display via the monitoring module 212.

Figure 5A:
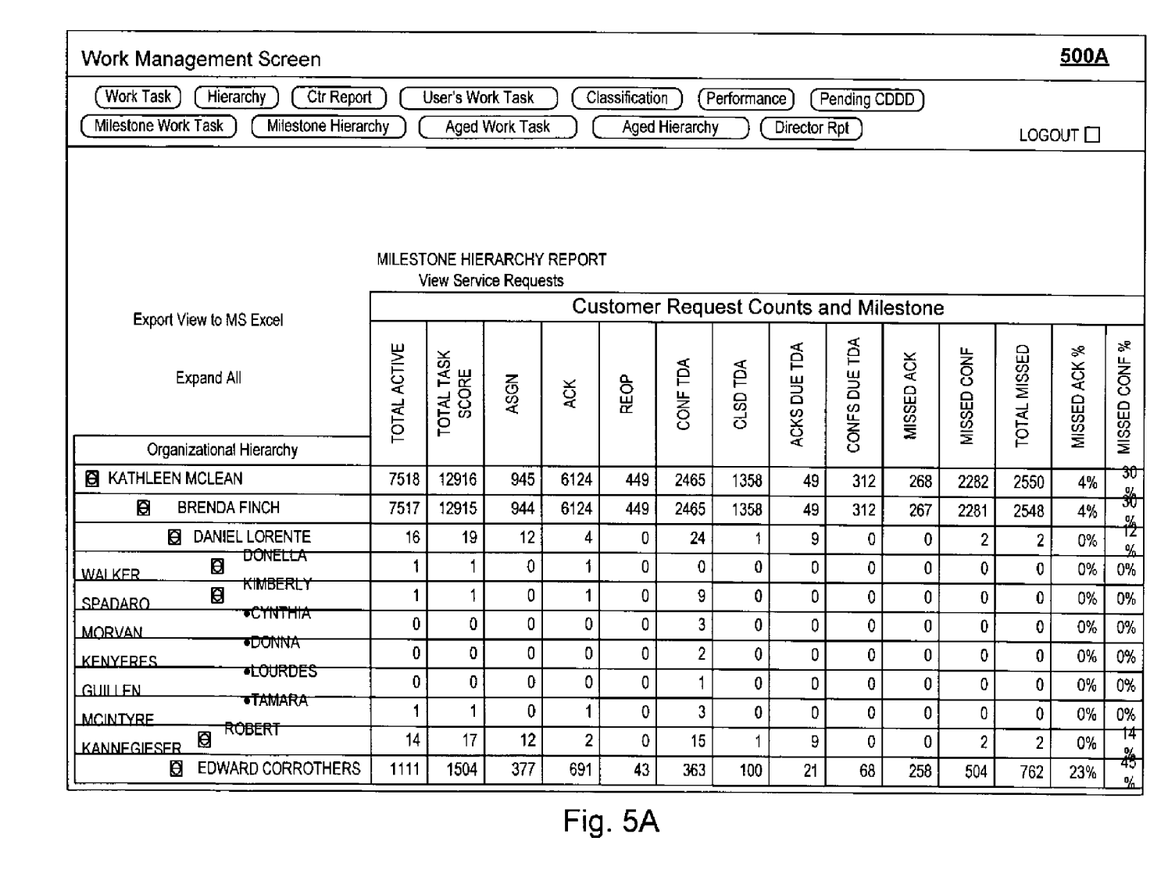

FIGS. 5A-5B depict illustrative screens for processing and managing electronic requests, according to an exemplary embodiment. In FIG. 5A, a universal work management screen 500A may show real-time reporting and alerting features to one or more users. It should be appreciated that an organization hierarchy is presented and respective milestones and requests counts. For example, Kathleen McLean has 7518 total active work items, with 6124 acknowledged, 449, reopened, etc. This screen 500A may provide an important automated work management tool based on multi-dimensional attributes such as product, state, email address, customer name, etc. All manual work in center may be measured and reported and moving work from one center or group to another may be easy to do as well as to track and monitor.

In FIG. 5B, an assigned work screen 500B may be provided. In this example, customer requests and service requests may be broken down into greater detail. For instance, each customer request may comprise one or more service requests, where each service request may be assigned and distributed to a different user. Management and linkage of all these requests may be easily viewed in the screen 500B. Furthermore, milestone indicators may be used to call attention to missed or nearly missed acknowledgments and confirmations. In addition order status notifications may be reflected in work lists in real-time or near real-time.

Figure 6:
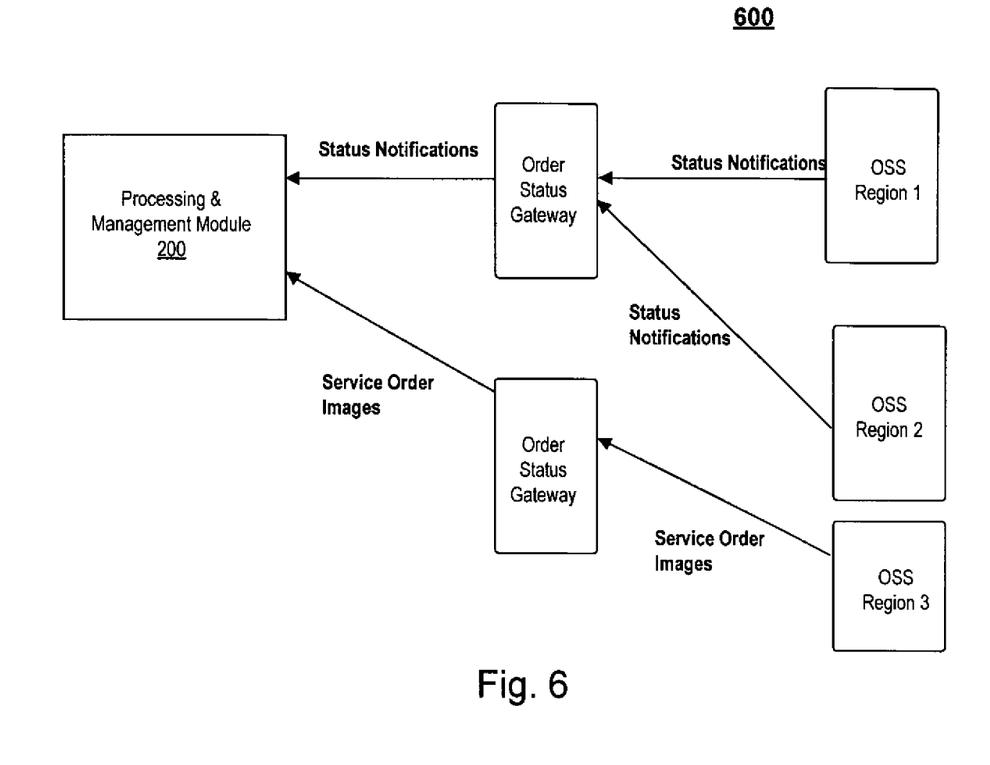
FIG. 6 depicts an illustrative flow for processing and managing electronic requests using a status notification, according to an exemplary embodiment.

FIG. 6 depicts an illustrative flow for processing and managing electronic requests using a status notification 600, according to an exemplary embodiment. In this flow 600, the processing and management module 200 may receive from the input module 202 a variety of data from downstream systems and components or various back-end Operations Support Systems (OSSs) as well. In traditional systems, once requests are forward to various systems for processing or work, there is typically no feedback or transmission of status of the work item. By configuring the processing and management module 200 to receive status notifications, service order images, etc., the management module 210 of the processing and management module 200 may use this additional data and information to provide users, via the monitoring module 212, the ability to check on the status of the work items. As a result, a more accurate and reliable reporting system may be provided and improved business metrics maybe fine-tuned in real-time or near real-time. Furthermore, long term archival and reporting may also be provided. Overall proficiency and business operation may therefore be optimized.

Figure 7A:
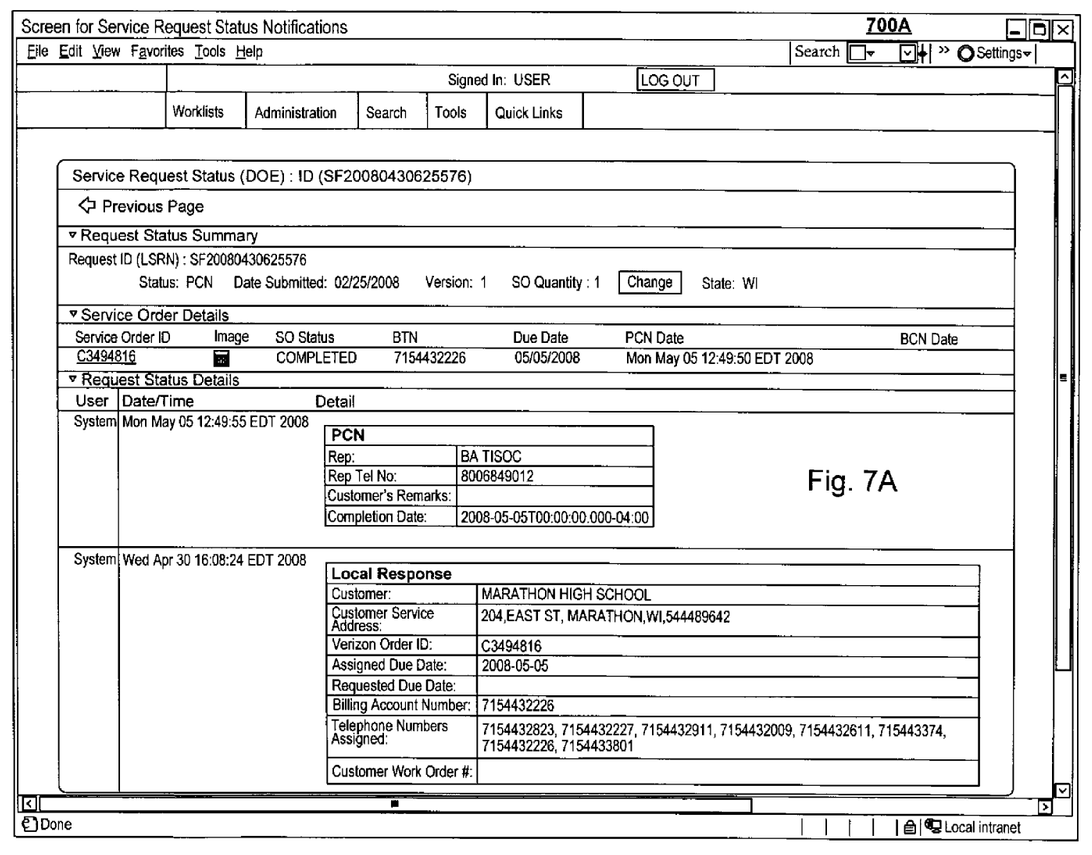
FIG. 7A depicts an illustrative screen for service request status notifications, according to an exemplary embodiment.

FIG. 7A depicts an illustrative screen for service request status notifications 700A, according to an exemplary embodiment. In this screen 700A, service requests status summaries may be presented via the monitoring module 212. The service order ID, service order image, status, due date, and other related information may be provided to a user in real-time or near real-time. The screen 700A may also include buttons and hyperlinks to view any of the presented information in greater detail.

FIG. 7B depicts an illustrative screen for assigned work 700B, according to an exemplary embodiment. In this screen 700B, assigned work may be presented in a work list, showing information about a particular customer, his or her email address, subject, etc. It should be appreciated that milestones and fulfillment status may also be presented in this screen 700B.

Figure 7C:
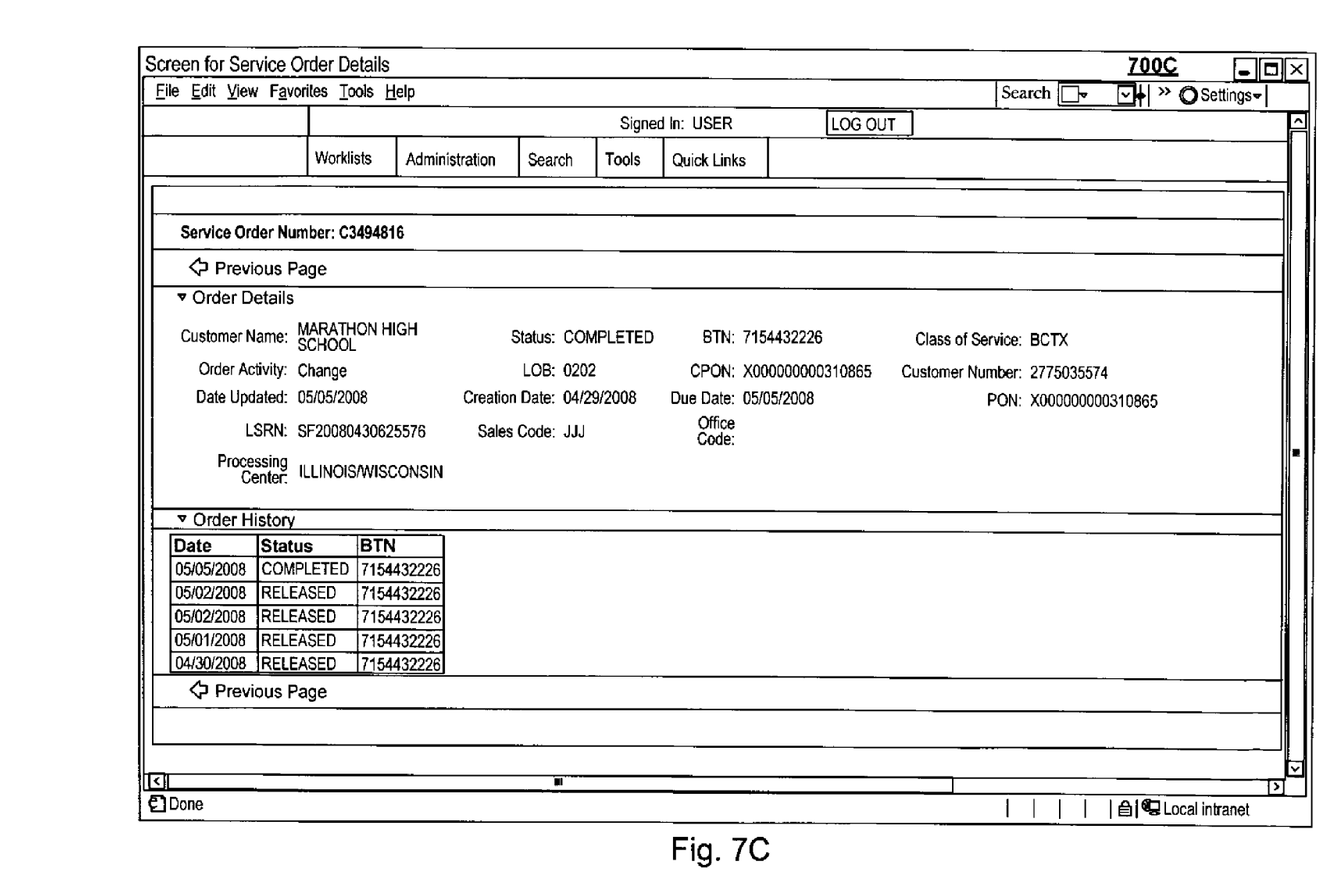
FIG. 7C depicts an illustrative screen for service order details, according to an exemplary embodiment.

FIG. 7C depicts an illustrative screen for service order details 700C, according to an exemplary embodiment. In this screen 700C, details for a particular service order may be presented. Here, the customer name, order activity, status, history, and other status order information may be presented to a user. In some embodiments, a user may directly view this screen 700C by search or input. In other embodiments, a user may view this screen by selecting a details option from the screens 700A, 700B of FIGS. 7A-7B.

Figure 7D:
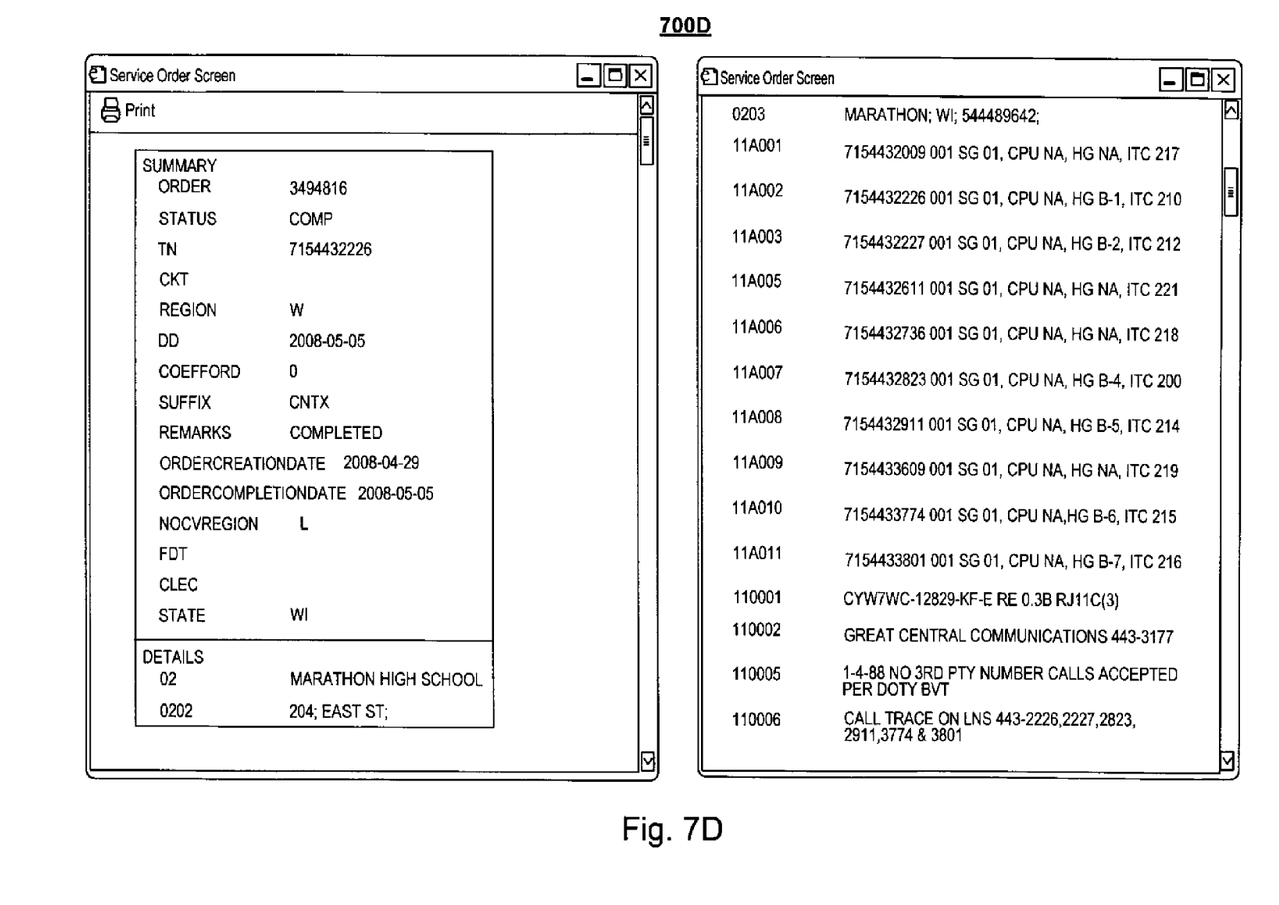
FIG. 7D depicts an illustrative screen for service order images, according to an exemplary embodiment.

FIG. 7D depicts an illustrative screen for service order images 700D, according to an exemplary embodiment. In this screen 700D, a service order image which may have been received from a downstream system or component may also be presented and reported. Here, an even more detailed and granular view of a particular service order may be presented. Reporting options, such a "print" or other similar actions, may be provided.

It should be appreciated that the system 100 of FIG. 1 and the system 200 of FIG. 2 may be implemented in a variety of ways. The architectures 100 and 200 may be implemented as a hardware component (e.g., as a module) within a network element or network box. It should also be appreciated that the architectures 100 and 200 may be implemented in computer executable software (e.g., on a computer-readable medium). Although depicted as a single architecture, module functionality of the architectures 100 and 200 may be located on a single device or distributed across a plurality of devices including one or more centralized servers and one or more pieces of customer premises equipment or end user devices.

While embodiments described above are primarily directed to processing, assigning, classifying, distributing, and managing electronic requests for a service provider, it should be appreciated that the processing and managing module 200 may also by other organizations and for other functions and features as well. For example, a company that sells toys may use the processing and management module 200 for receiving and fulfilling orders for sales, especially during a busy season. Such a system may also be useful a library, hospital, insurance company, or other entity that continuous receives electronic requests.

Other various embodiments and considerations may also be provided to optimize the processing and managing described above. It should also be appreciated that processing and management of electronic requests may be configured for operation by one or more customers, analysts, operators, or administrators. In other embodiments, the processing and managing of electronic requests may be entirely automatic or may be a combination of manual and automatic features, some embodiments of which are described above.

While depicted as various servers, components, elements, modules, or devices, it should be appreciated that embodiments may be constructed in software or hardware, as a separate or stand-alone device, or as part of an integrated system, device, or tool.

Additionally, it should also be appreciated that system support and updating the various components of the system may be achieved. For example, a system administrator may have access to one or more of the components of the system, network, components, elements, or device. It should also be appreciated that the one or more servers, components, elements, or devices of the system may not be limited to physical components. These components may be computer-implemented software-based, virtual, etc. Moreover, the various servers, components, elements, or devices may be customized to perform one or more additional features and functionalities. Such features and functionalities may be provided via deployment, transmitting or installing software or hardware.

It should also be appreciated that each of the communications devices, servers, modules, or network elements may include one or more processors. It should be appreciated that one or more data storage systems (e.g., databases) may also be coupled to each of the devices or servers of the system. In one embodiment, the one or more data storage systems may store relevant information for each of the servers and system components. It should also be appreciated that software may be implemented in one or more computer processors, modules, network components, services, devices, or other similar systems.

It should be appreciated that the contents of any of these one or more data storage systems may be combined into fewer or greater numbers of data storage systems and may be stored on one or more data storage systems or servers. Furthermore, the data storage systems may be local, remote, or a combination thereof to client systems, servers, or other system components. In another embodiment, information stored in the databases may be useful in providing additional personalizations and customizations.

By providing systems and methods for processing and managing electronic requests according to the above embodiments, a more efficient, accurate, and comprehensive way may be provided. Improved resource management, streamlined installations, and cost efficiencies may also be achieved.

Figure 8:
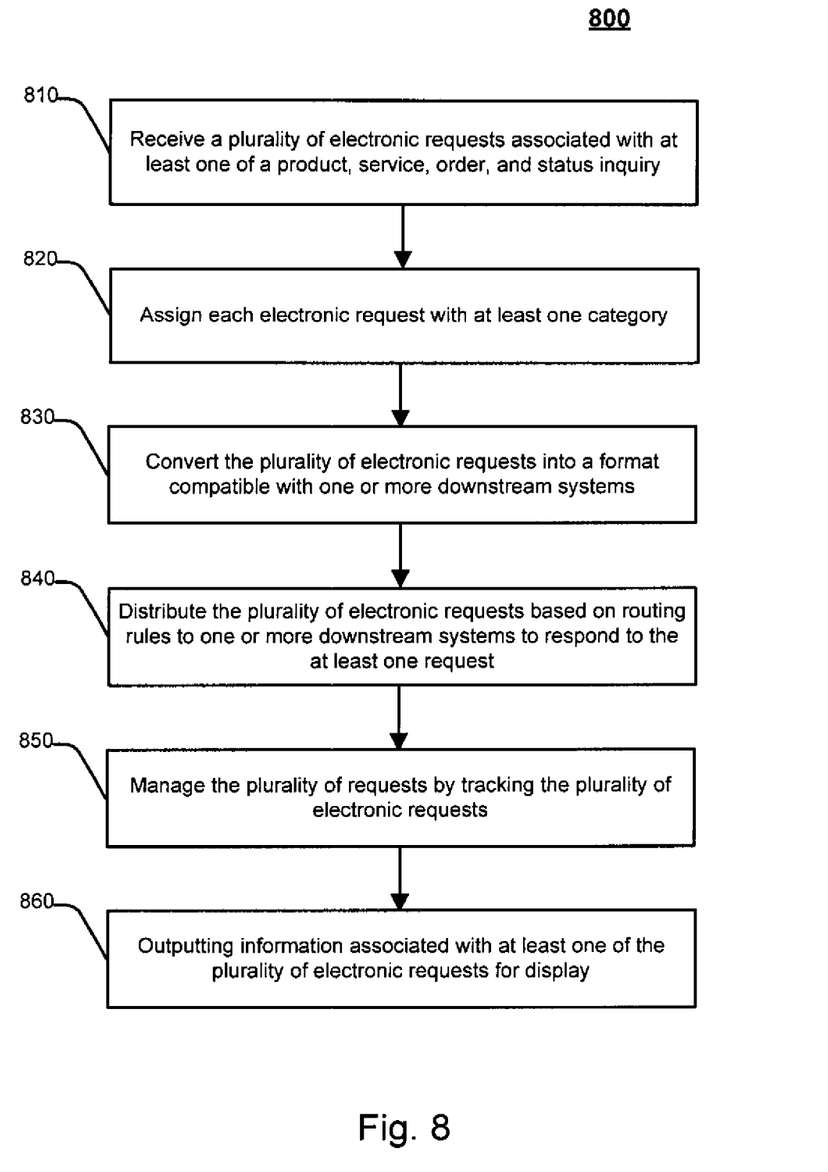
FIG. 8 depicts an illustrative flowchart of a method for processing and managing electronic requests, according to an exemplary embodiment.

FIG. 8 depicts an illustrative flowchart of a method for processing and managing electronic requests, according to an exemplary embodiment. The exemplary method 800 is provided by way of example, as there are a variety of ways to carry out methods disclosed herein. The method 800 shown in FIG. 8 may be executed or otherwise performed by one or a combination of various systems. The method 800 is described below as carried out by at least system 100 in FIG. 1 and system 200 in FIG. 2, by way of example, and various elements of systems 100 and 200 are referenced in explaining the exemplary method of FIG. 8. Each block shown in FIG. 8 represents one or more processes, methods, or subroutines carried in the exemplary method 800. A computer readable medium comprising code to perform the acts of the method 800 may also be provided. Referring to FIG. 8, the exemplary method 800 may begin at block 810.

At block 810, the input module 202 may be configured to receive a plurality of electronic requests. In some embodiments, each of the plurality of electronic requests may comprise at least one request associated with a product, service, order, and status. In other embodiments, the electronic requests may comprise at least one email, fax, voice, and web forms.

At block 820, the classification module 204 may be configured to assign each electronic request with at least one category. In some embodiments, the classification module 204 may assign categories by analyzing data in the electronic requests and identifying at least one classification attribute. In some embodiments, for example, these classification attributes may include name of customer, email address, subject, source of request, type of request, type of product, address of customer, previous requests, date, time, key words or phrases, other attribute. In some embodiments, the classification module 204 may assign categories using natural language processing, as described above.

At block 830, the transformation module 206 may be configured to convert the plurality of electronic requests into a format compatible with one or more downstream systems. In some embodiments, the transformation module 206 may convert the plurality of electronic requests into an extensible markup language (XML) format or other similar format.

At block 840, the distribution module 208 may be configured to distribute the plurality of electronic requests based on routing rules to one or more downstream systems. In some embodiments, the one or more downstream systems may respond and take at least one action on the at least one request. It should be appreciated that distributing of the plurality of electronic requests may be automatic. In some embodiments, the routing rules may be configurable routing rules. In other embodiments, the routing rules may be skill-based routing rules.

At block 850, the management module 210 may be configured to manage the plurality of electronic requests. The management module 210 may receive status notifications associated with the at least request from the one or more downstream systems. The management module 210 may also be configured to provide multiple channel interaction, automated and manual communication, template management, or other management feature or function.

At block 860, the monitoring module 212 and the output module 216 may be configured, singly or jointly, to present information associated with at least one of the plurality of electronic requests to a user via a graphical user interface. In some embodiments, the information associated with at least one of the plurality of electronic requests may comprise real-time or near real-time status monitoring, tracking workflow, hierarchal monitoring, or other monitoring feature or function.

It should be appreciated that the set of instructions, e.g., the software, that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In summary, embodiments may provide a system and method for comprehensively and effectively processing and managing electronic requests. It should be appreciated that although embodiments are described primarily with systems management technologies, the systems and methods discussed above are provided as merely exemplary and may have other various applications and implementations.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

We claim:

1. A system, comprising:
an input module configured to receive a plurality of electronic requests submitted by at least one subscriber or potential subscriber of telephone, data, or voice services, each of the plurality of electronic requests comprising at least one request associated with a product, service, order, and status;
a classification module configured to automatically assign each electronic request to at least one category based on content in the electronic request, the classification module communicatively coupled to one or more dictionaries or databases that aid in assignment of each electronic request;
a transformation module configured to convert the plurality of electronic requests into a format compatible with one or more downstream systems;
a distribution module configured to distribute the plurality of electronic requests based on routing rules to one or more queues of one or more downstream systems, whereby the one or more downstream systems can respond to the at least one request;
a management module configured to manage the plurality of electronic requests, wherein managing the plurality of electronic requests comprises receiving status notifications associated with the at least one request from the one or more downstream systems; and
a monitoring module configured to present, via a graphical user interface, information associated with at least one of the plurality of electronic requests to a user distinct from the at least one subscriber or potential subscriber, the information comprising:
fulfillment status of the electronic request from the at least one subscriber or potential subscriber; and
at least one of: real-time or near real-time status monitoring, tracking workflow, or hierarchal monitoring information.

2. The system of claim 1, wherein the electronic requests comprises at least one of: email, fax, voice, and web forms.

3. The system of claim 1, wherein the classification module assigns categories by analyzing the content of the electronic requests and identifying at least one classification attribute from the content of the electronic request.

4. The system of claim 3, wherein the classification attribute from the content of the electronic request comprises name of customer, email address, subject, source of request, type of request, type of product, address of customer, previous requests, date, time, and key words or phrases.

5. The system of claim 1, wherein the classification module assigns categories using natural language processing.

6. The system of claim 1, wherein the transformation module converts the plurality of electronic requests into an extensible markup language (XML) format.

7. The system of claim 1, wherein distributing of the plurality of electronic requests comprises automatic distribution.

8. The system of claim 1, wherein the routing rules are configurable and skill-based.

9. The system of claim 1, wherein the management module is further configured to provide multiple channel interaction, automated or manual communication, and template management.

10. A method, comprising:
receiving, at an input module, a plurality of electronic requests associated with at least one of a product, service, order, and status from at least one subscriber or potential subscriber of telephone, data, or voice services;
assigning, by a classification module, each electronic request to at least one category based on content in the electronic request, the classification module communicatively coupled to one or more dictionaries or databases that aid in assigning each electronic request;
converting, at a transformation module, the plurality of electronic requests into a format compatible with one or more downstream systems;
distributing, by a distribution module, the plurality of electronic requests based on routing rules to one or more queues of one or more downstream systems, whereby the one or more downstream systems can respond to the at least one request;
managing, at a management module, the plurality of electronic requests, wherein managing the plurality of electronic requests comprises receiving status notifications associated with the at least one request from the one or more downstream systems; and
outputting, via a monitoring module, information associated with at least one of the plurality of electronic requests for display, via a graphical user interface, to a user distinct from the at least one subscriber or potential subscriber, the information comprising:
fulfillment status of the electronic request from the at least one subscriber or potential subscriber; and
at least one of: real-time or near real-time status monitoring, tracking workflow, or hierarchal monitoring information.

11. The system of claim 10, wherein the electronic requests comprises at least one of: email, fax, voice, and web forms.

12. The system of claim 10, wherein the classification module assigns categories by analyzing the content of the electronic requests and identifying at least one classification attribute from the content of the electronic request.

13. The system of claim 12, wherein the classification attribute from the content of the electronic request comprises name of customer, email address, subject, source of request, type of request, type of product, address of customer, previous requests, date, time, and key words or phrases.

14. The system of claim 10, wherein the classification module assigns categories using natural language processing.

15. The system of claim 10, wherein the transformation module converts the plurality of electronic requests into an extensible markup language (XML) format.

16. The system of claim 10, wherein distributing of the plurality of electronic requests comprises automatic distribution.

17. The system of claim 10, wherein the routing rules are configurable and skill-based.

18. The system of claim 10, wherein the management module is further configured to provide multiple channel interaction, automated or manual communication, and template management.

19. A non-transitory computer readable medium comprising code which when executed causes a computer to perform the method of claim 10.

20. The system of claim 1, wherein the monitoring module is configured to present to the user via the graphical user interface service request status notifications, the service request status notifications including service order ID, service order status, and due date.

* * * * *